Dec. 30, 1969     H. D. HOWARTH     3,486,786
COMBINATION CAMPER AND BOAT VEHICLE
Filed Sept. 18, 1967     5 Sheets-Sheet 1
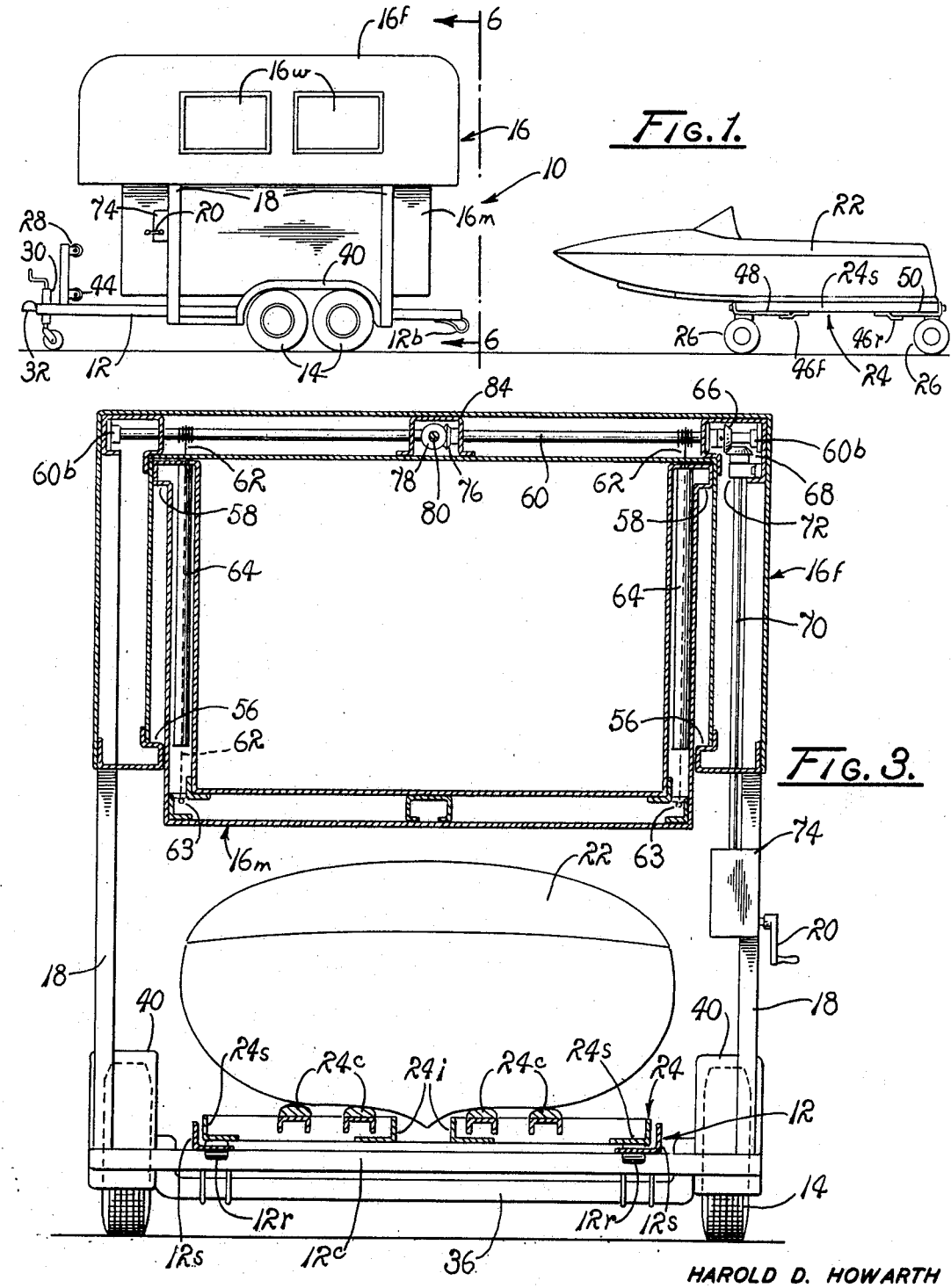
HAROLD D. HOWARTH
INVENTOR
ATTORNEYS

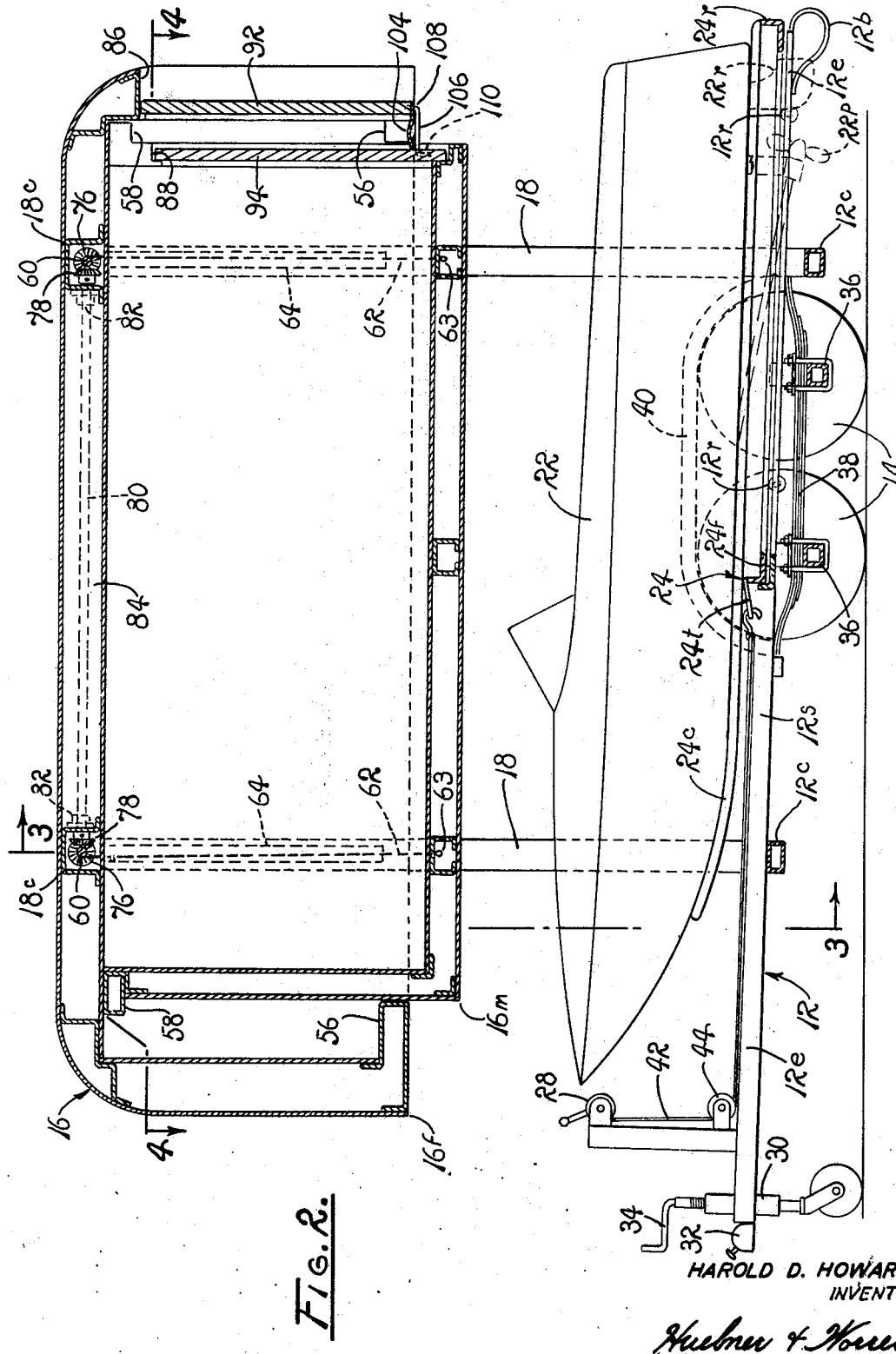

Dec. 30, 1969  H. D. HOWARTH  3,486,786
COMBINATION CAMPER AND BOAT VEHICLE
Filed Sept. 18, 1967  5 Sheets-Sheet 3

HAROLD D. HOWARTH
INVENTOR

Huebner & Worrel
ATTORNEYS

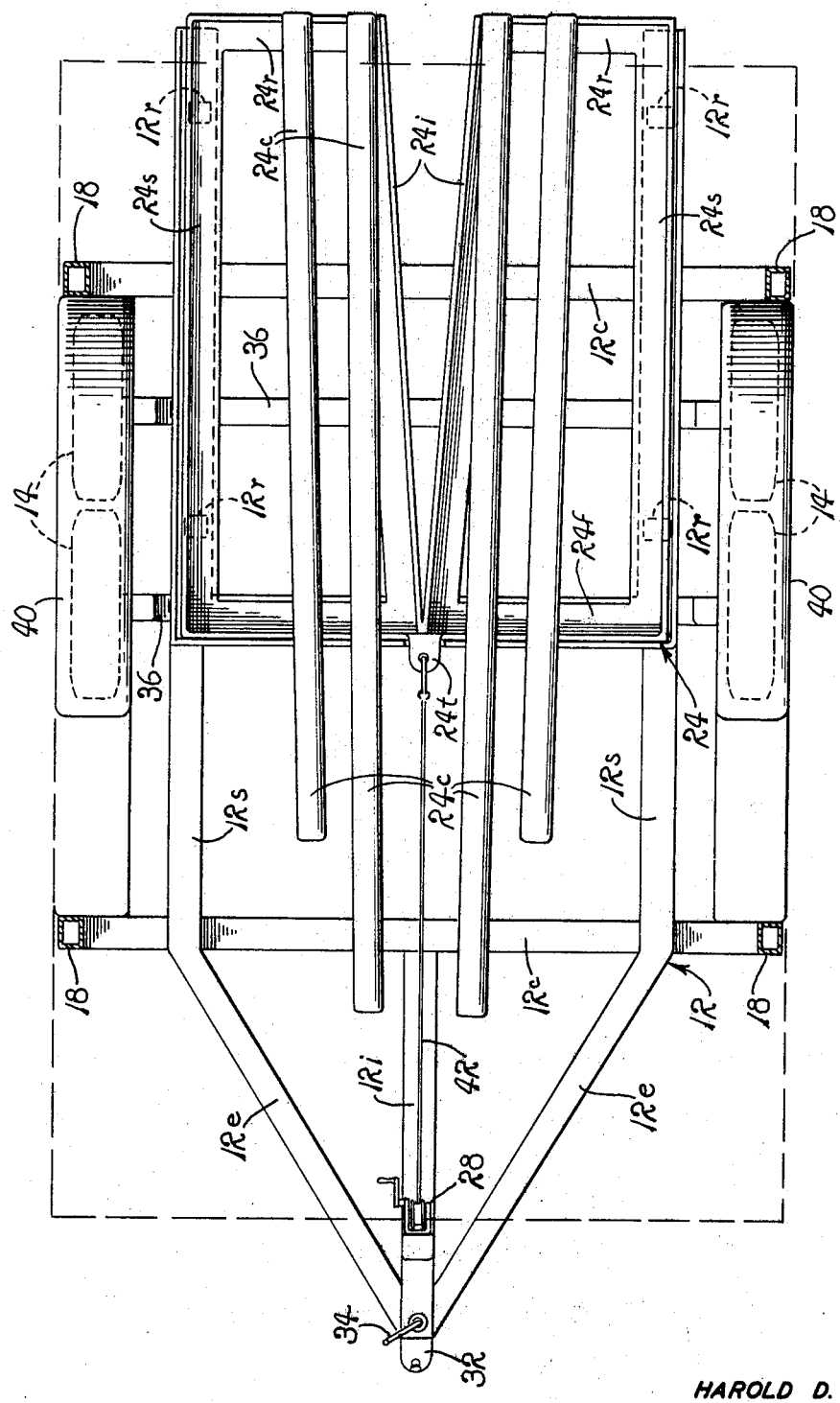

Dec. 30, 1969 H. D. HOWARTH 3,486,786
COMBINATION CAMPER AND BOAT VEHICLE
Filed Sept. 18, 1967 5 Sheets-Sheet 5
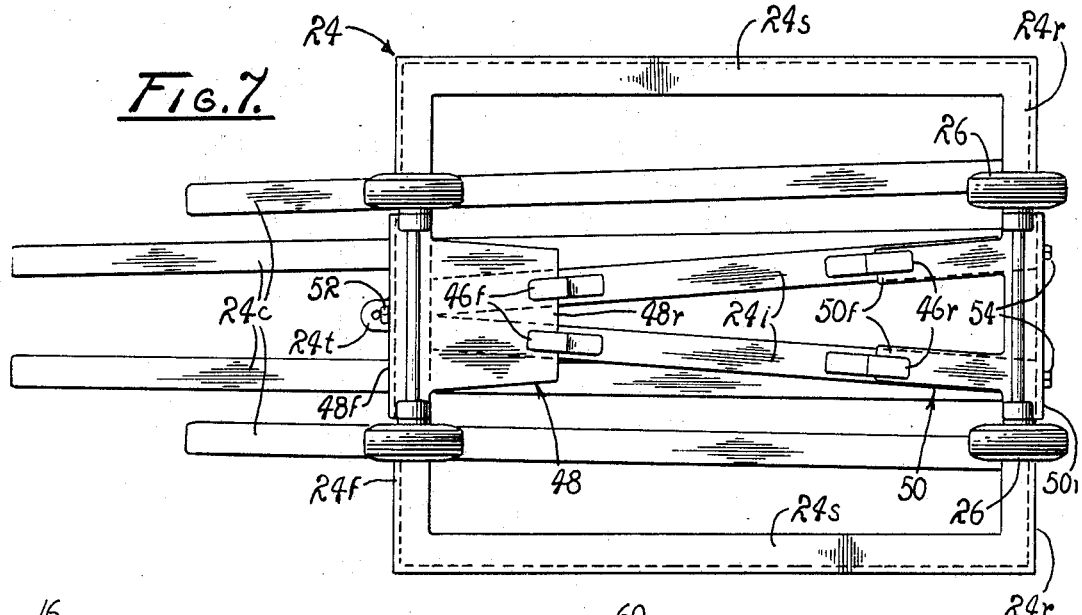
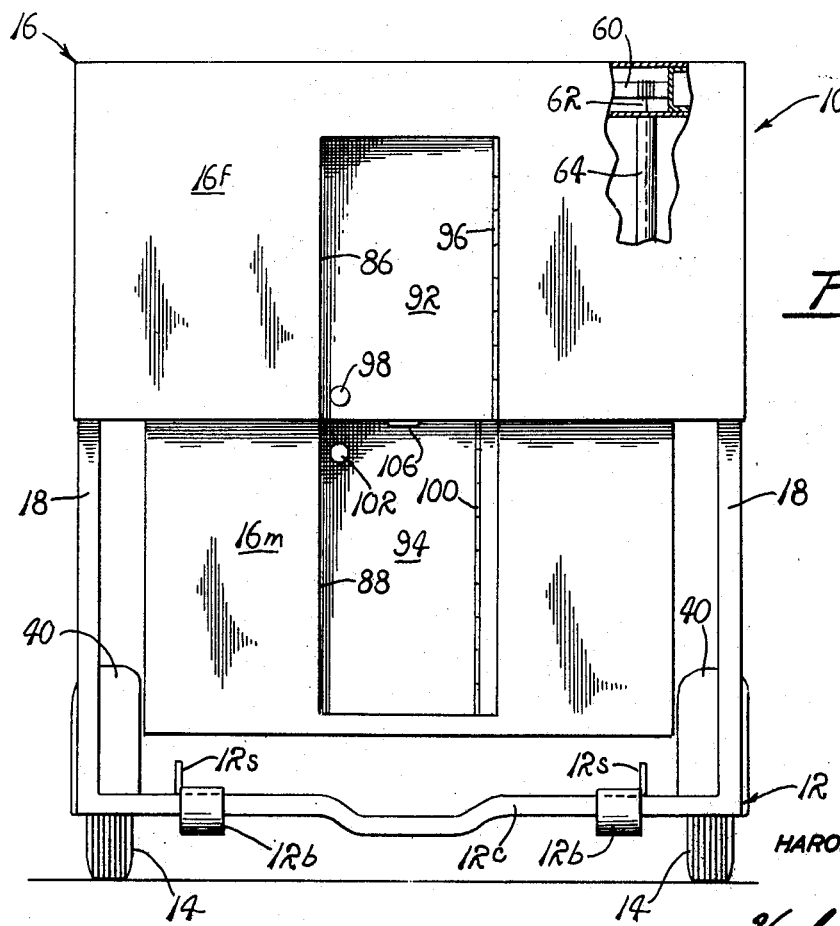
HAROLD D. HOWARTH
INVENTOR
Huebner + Worrel
ATTORNEYS

3,486,786
COMBINATION CAMPER AND BOAT VEHICLE
Harold D. Howarth, 1482 Burton,
Tulare, Calif. 93274
Filed Sept. 18, 1967, Ser. No. 668,499
Int. Cl. B60f 5/00; B60p 3/32
U.S. Cl. 296—23      6 Claims

ABSTRACT OF THE DISCLOSURE

A combination camper and boat vehicle for carrying living quarters for campers and a boat including a wheeled carriage having a bed for receiving and supporting said boat, the quarters being disposed over the vehicle bed and having a vertically movable portion which telescopes into a fixed portion and is extensible therefrom, the removable portion in the extended position thereof providing living accommodations but retractable therefrom for providing space to receive the boat.

BACKGROUND OF THE INVENTION

The present invention relates to camper vehicles and boat trailers and more particularly to a vehicle adapted to carry a boat as well as quarters for campers.

Many families have a love of nature and the outdoors, often spending their vacation and even weekends traveling out to the mountains and lakes in order to camp and fish. Such families frequently own a camper trailer or a camper and sometimes a boat. However, a camper trailer and a boat trailer require two motor cars or trucks of sufficient power to tow the same, particularly where grades may be encountered in the travel to the campsite. Even when a family owns a camper mounted on a motor vehicle chassis, the towing of a boat trailer puts a restriction on the maximum speed at which the camper may travel since the speed limit for vehicles towing a trailer is generally less than the limit for vehicles without a trailer.

SUMMARY OF INVENTION

It is therefore an object of the present invention to provide a vehicle which is adapted to carry both living accommodations or quarters for campers and a boat as well.

Another object is to provide a vehicle for carrying campers' quarters and a boat which is of a height to negotiate underpasses with sufficient clearance.

A further object is to provide a camper and a boat carrier in which a low silhouette is achieved by providing a movable portion moved out of the way to accommodate the boat during travel.

Still another object is to provide a camper and boat carrier in which the camper is provided with a telescoping extensible portion disposable in extended position to provide living accommodations and retractable to provide space to accommodate the boat on the carrier.

A still further object is to provide a cradle or dolly for supporting the boat, which dolly is provided with wheels for ease in loading and unloading the boat, the wheels being detached from the dolly when the boat is loaded.

These and other objects and advantages are achieved by the present invention which provides a vehicle for carrying campers' quarters and a boat including a wheeled carriage having a bed for receiving and supporting the boat, the quarters being disposed over the bed and having a vertically movable portion which telescopes within a fixed portion, the movable portion, with the boat unloaded, being disposed in an extended position for providing living accommodations for the campers and retractable into the fixed portion from the bed to provide space to receive the boat.

BRIEF DESCRIPTION OF THE DRAWINGS

FIG. 1 is a side elevation schematically illustrating a vehicle embodying the principles of the present invention with the boat shown unloaded therefrom and the vehicle arranged to provide living quarters.

FIG. 2 is a side view in vertical section, on a larger scale, showing the vehicle arranged to accommodate the boat and the boat loaded thereon.

FIG. 3 is a vertical section taken at a position indicated by line 3—3 of FIG. 2.

FIG. 5 is a sectional plan view taken generally at the position indicated by line 5—5 of FIG. 2 but with the boat omitted.

FIG. 6 is a rear elevation looking in the direction of the arrows 6—6 in FIG. 1, but on a larger scale and partly in section, with parts broken away, FIG. 7 is a bottom plan view of the boat dolly or cradle with the wheels thereof attached.

DESCRIPTION OF THE PREFERRED EMBODIMENT

Figure 4:
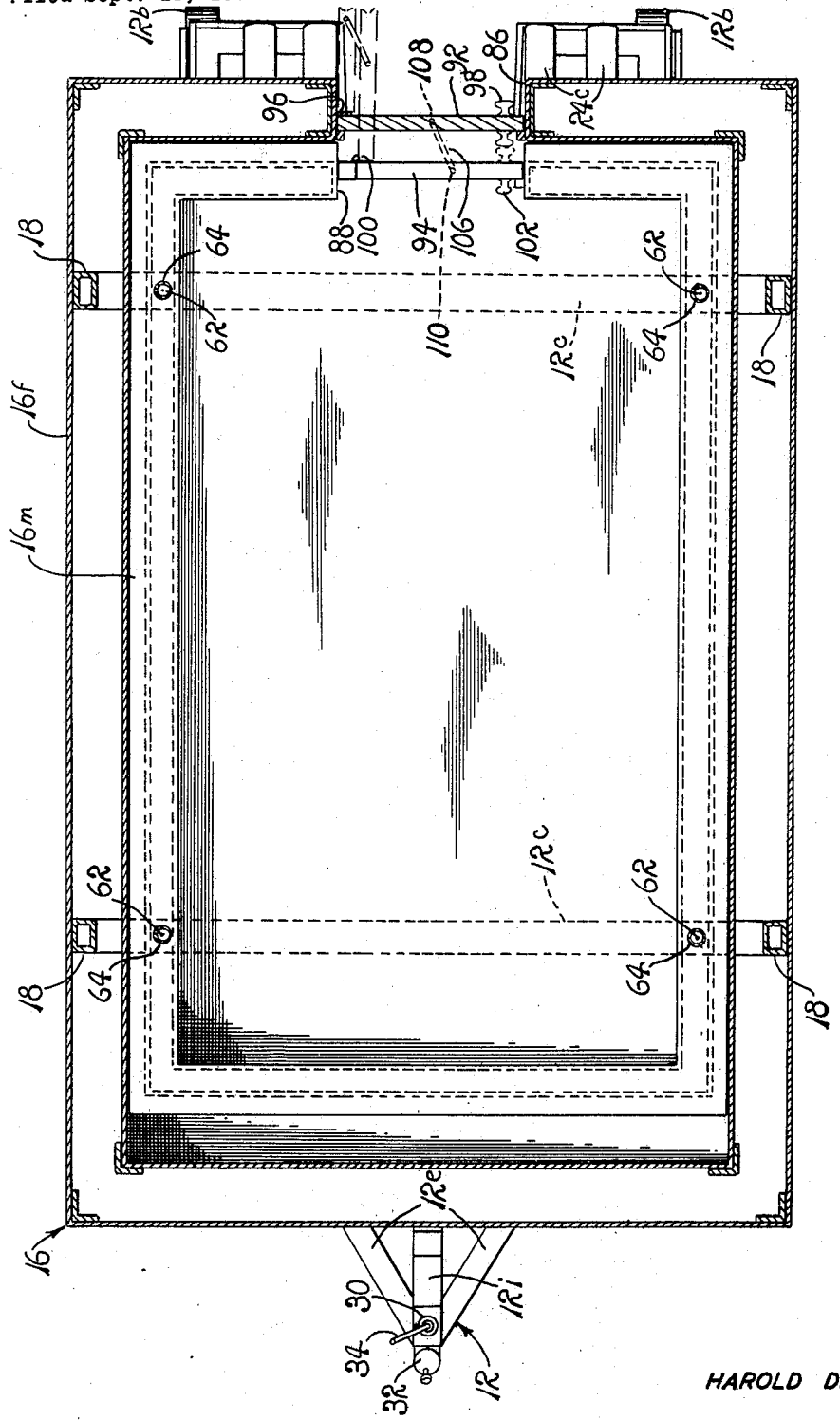
FIG. 4 is a sectional plan view taken generally at the position indicated by line 4—4 of FIG. 2.

Referring now to the drawing, there is schematically illustrated in FIG. 1 a vehicle designated generally by reference numeral 10 which embodies the principles of the present invention and includes a carriage, frame or chassis 12 provided with road wheels 14 and carrying campers' quarters or living accommodations in the form of a cabin 16. The cabin 16 includes a top portion 16f secured to vertical structural members or columns 18 fixed to the sides of the frame 12, the columns being of any suitable shape, for example, of box or channel form, the portion 16f being vertically spaced from the frame and having windows 16w. Cabin 16 also includes a vertically movable portion 16m which is telescopically fitted to portion 16f, as will later appear, and is vertically liftable or retractable thereinto by lift means controlled by crank 20. In its lowered position, the portion 16m cooperates with the portion 16f to provide living accommodations or quarters similar to those in a conventional camper. However, when portion 16m is retracted into the portion 16f, space therebelow is provided for receiving and supporting a motorboat 22 on the carriage 12. The boat 22, when unloaded, may rest upon a cradle or dolly 24 fitted with detachable wheels 26, the dolly being adapted to be pulled by a winch device 28 for loading the boat on the vehicle, the wheels 26 being detached from the dolly in the travel position of the boat on the chassis 12. In addition to wheels 14, carriage 12 may also be provided with an adjustable levelling wheel or jack 30, a hitch 32, and bumpers or guards 12b.

Turning to FIGS. 2 and 5, the frame 12 is fabricated of suitable material, appropriately shaped, and is composed of side members 12s and cross members 12c which provide a supporting bed, the side members having converging forward extensions 12e joined to an intermediate member 12i for providing a support for the winch 28 and the levelling wheel 30, the levelling wheel being controlled by a crank 34. Wheels 14 are mounted on transversely disposed axle supports 36 which carry springs 38, the springs being connected to the carriage frame side members 12s, each pair of wheels 14 having a suitable mud guard or fender 40 thereover. The winch device 28 has connected thereto a rope or cable 42 which passes around an idler pulley 44 and is adapted to be connected to a forwardly directed extension or tongue 24t on the cradle or dolly 24.

As will be noted in FIGS. 5 and 7, the dolly 24 is generally rectangular in shape and may be fabricated of angle iron members 24f, 24s, 24r and 24i arranged to provide an elongated V-shaped opening V defined by the interiorly disposed angle irons 24i and opening to the rear of the dolly. This opening is for the purpose of accommodating the propeller 22p and rudder 22r of the motorboat 22 (FIG. 2), the dolly or cradle 24 having elongated members 24c for cradling the boat and the forward ends of the members being curved to fit the contour of the forward portion of the boat. Members 24c may be of channel cross section, as shown in FIG. 3, and be padded or otherwise covered to better fit the hull of the boat and protect against marring the surface thereof. The dolly 24 is so dimensioned that the side members 24s thereof rest upon side members 12s of the carriage 12 when the dolly is loaded thereon, the members 12s being provided with a plurality of rollers 12n to assist the loading.

Referring to FIG. 7, the undersides of the angle irons 24i have secured thereto forwardly directed angle elements 46f and rearwardly directed angle elements 46r, these elements defining with the angle irons 24i two pairs of notches for detachably receiving wheel connectors 48 and 50 on which the wheels 26 are journaled. Connector 48 is in the form of a plate, the rear end 48r thereof being received in the pair of notches associated with elements 46f and the front end 48f having an angulated edge through which a bolt or pin 52 passes and is secured in front 24f of the dolly 24. Connector 50, however, is bifurcated in form and front ends of the bifurcations 50f are received in the pair of notches associated with the elements 46r, the rear end 50r of the connector having an angulated edge through which bolts or pins 54 pass into the rear portions 24r of the dolly 24.

Directing attention also to FIGS. 3 and 4, it will be noted that the portions 16f and 16m of the cabin 16 are of double wall construction and may be fabricated of essential elements such as roof rails, sill beams, channels, angle irons, plates and the like, which provide the requisite reinforcement or strength necessary for structural stability and integrity and a suitable skin or outer covering. As seen in FIGS. 2 and 3, the portion 16m is telescopically fitted within the portion 16f, the latter in the fabrication thereof being provided with an upwardly facing shoulder surface 56, and portion 16m being provided with a downwardly facing shoulder surface 58 which engages the surface 56 upon the lowering of the portion 16m to limit the extension thereof. Each of the surfaces 56 and 58 may be provided with a sufficient layer of resilient material, for example, rubber or the like, to effect a seal against the entry of air and insects. The sidewalls of portion 16f may be formed with appropriate apertures to receive windows 16w therein, preferably located between the vertical supports or columns 18.

The upper ends of the channel columns 18 opposite each other are bridged by a cross channel member 18c suitably secured thereto (FIG. 2). Housed within each of the cross channels 18c is a lift mechanism in the form of a rotary shaft 60 having lines or cables 62 coiled thereabout, the ends of the shaft being journaled in bearings 60b mounted on columns 18 and the ends of the cables being suitably secured to the cabin portion 16m, as at 63 in FIG. 3. The linear portion of each of the cables may pass through a protective tube 64, the upper end of which is attached to the ceiling of cabin portion 16f (FIG. 6) and telescopes into the double wall space of the portion 16m when the latter is retracted (FIG. 3).

One of the shafts 60 (FIG. 3) is provided with a bevel gear 66 which meshes with a bevel gear 68 secured to the end of a shaft 70 which is journaled in bearings 72 and a gear box 74, the latter containing gearing suitable for rotation of shaft 70 by turning of the crank 20. Each of the rotary shafts 60 has secured thereto a bevel gear 76, each of which meshes with one of a pair of bevel gears 78 secured to the ends of a shaft 80 journaled in bearings 82 and housed in a channel member 84, the ends of which are secured to cross channels 18c. Thus, upon turning crank 20 to impart rotation to shaft 70 in the proper direction, shafts 60 are rotated to wind the lines or cable 62 and lift the movable portion 16m of the cabin 16 up to the position shown in FIGS. 2 and 3. Crank 20 may be removable to avoid lateral projections beyond the cabin 16.

It is intended that when the boat 22 has been unloaded from the vehicle 10 and the vehicle has been moved to the campsite where it is disposed on a fairly level portion of the ground or the vehicle is levelled by means of the levelling wheel 30, the movable cabin portion 16m is extended and disposed in its lowermost position with the shoulder surfaces 56 and 58 in contact with each other. In this position of the portion 16m, the cabin 16 is effective to provide living accommodations or quarters for campers, entry thereinto being through openings 86 and 88 formed in the cabin portions 16f and 16m, respectively. As seen in FIGS. 2 and 4, because of the telescopic arrangement and the offset walls of portions 16f and 16m, these openings are necessarily spaced apart and a pair of half-doors 92 and 94 are therefore employed to close the openings, half-door 92 being hinged to the portion 16f as at 96 and provided with a doorknob 98, half-door 94 being hinged to the portion 16m at 100 and having a doorknob 102. To fill the space between the half-doors against the entry of air and insects, half-door 92 has secured thereto an arcuate piece of resilient material 104 so located that a seal may be effected against air and insects when the portion 16m is in the telescoped or retracted position as well as in the extended or down position.

To effect swinging of the doors together, a link 106 may be provided which is of a length a little greater than the distance between the hinges 96 and 100 and is pivotally connected to the half-doors 92 and 94, as at 108 and 110. The link 106 is preferably in the form of a hook so as to be optionally attachable to pivot 110 or 110a on half-door 94, depending on the disposition of portion 16m.

Advantage may be taken of the double wall construction of the cabin portions 16f and 16m for the purpose of accommodating folding beds or bedrolls, particularly in the forward part of the former, and to provide cabinet or storage space.

OPERATION

The operation of the device of the present invention is believed to be clearly apparent and is briefly summarized at this point. Returning to FIG. 1, when it is desired to load the boat 22 onto the vehicle frame 12, furniture and other contents, not shown, are arranged within the cabin portions 16f and 16m so that there will be no interference when portion 16m is lifted or retracted into portion 16f, half-door 94 being closed but half-door 92 preferably left open and unlinked from half-door 94. Crank 20 is then manipulated in the proper direction to rotate shaft 70 so as to turn rotary shafts 60 in a direction which winds up the cables 62 thereon for retracting the cabin portion 16m into the cabin portion 16f. The boat 22, supported on its wheeled dolly 24, is pointed into the space between the bed of the carriage frame 12 and the bottom of the portion 16m, centrally thereof. The rope or cable 42 is then attached to the tongue or tab 24t on the dolly 24 and the winch 28 is operated to draw the dolly and the boat into the space. If necessary, crank 34 may be manipulated to lower the rear end of the vehicle frame 12 in order that the forward edge of the frame of the dolly 24 be disposed on the bumpers 12b at the rear ends of the side members 12s of the frame. Afterwards the levelling wheel 30 is adjusted to take the weight of the front end of the dolly off the front wheels 26 thereof, whereupon these wheels may be detached from the dolly. With continued operation of the winch device 28, the dolly and the boat are drawn forwardly, the dolly riding over the roller 12r. Prior to the time the boat and dolly are completely drawn into the space, the rear wheels 26 of the dolly are removed and the dolly drawn in to dispose the boat in the position shown in FIG. 2, the dolly and boat being suitably fastened so as to be securely held during travel of the vehicle. In unloading the boat, the procedure as to the wheels 26 is reversed. The dolly, of course, may be used to launch the boat.

There has thus been provided a vehicle which is a combination camper and boat trailer and which requires only one self-propelled motor vehicle for the transportation thereof.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus. For example, although the invention has been described in connection with a trailer vehicle, it will be appreciated that it could be adapted as well to the frame or chassis of a self-propelled motor vehicle.

Having described my invention, what I claim as new and desire to secure by Letters Patent is:

1. A combination camper and boat vehicle for carrying living quarters for campers and a boat comprising, in combination:

a wheeled carriage,
   living quarters for campers supported on said carriage and comprising a first portion fixed to said carriage and a second portion disposed in a telescopic relationship with said first portion and displaceable relative thereto, said second portion occupying space on said carriage in the normal use thereof to provide living quarters for campers,
   means for vertically telescopingly displacing said second portion relative to said first portion for vacating said space, and
   a boat carried in said vacated space.

2. The vehicle of claim 1 wherein:
   said portions are vertically disposed with respect to each other.

3. A combination camper and boat vehicle comprising, in combination:

a wheeled chassis frame having a bed adapted to receive a boat supported on a cradle and having detachable wheel means, said cradle being received and supported on said bed, and
   living quarters including floor and wall means for campers disposed above said bed and movable away from said bed to provide space to receive such boat.

4. The trailer of claim 3 wherein:
   said quarters for campers has a portion fixed relative to said frame bed, and
   said movable portion telescopes within said fixed portion and is extensible therefrom.

5. The vehicle of claim 4 wherein:
   said fixed portion is provided with an inwardly directed, upwardly facing shoulder surface, and
   said movable portion is provided with an inwardly directed downwardly facing surface engageable with said first named shoulder surface when said movable portion is extended from said fixed portion to provide living accommodations for campers.

6. The vehicle of claim 5 wherein:
   each of said portions is provided with an entry opening and a half-door for closing said opening in each of the portions, respectively,
   means for linking said half-doors together for simultaneous movement, and
   resilient means attached to said half-doors engageable with each other to effect a seal against the entry of air and insects when said half-doors are in the closed positions thereof.

References Cited

UNITED STATES PATENTS

| | | | |
|---|---|---|---|
| 3,116,949 | 1/1964 | Muse | 296—23 |
| 2,847,136 | 8/1958 | Neff | 296—23 |
| 3,179,462 | 4/1965 | Hagen | 296—23 |

PHILIP GOODMAN, Primary Examiner

U.S. Cl. X.R.

9—1